United States Patent [19]

Schramm et al.

[11] Patent Number: 5,070,055

[45] Date of Patent: Dec. 3, 1991

[54] NOVEL COIMPREGNATED VANADIUM-ZIRCONIUM CATALYST FOR MAKING POLYETHYLENE WITH BROAD OR BIMODAL MW DISTRIBUTION

[75] Inventors: Kathleen D. Schramm, Neshanic; Frederick J. Karol, Belle Mead, both of N.J.

[73] Assignee: Union Carbide Chemicals and Plastics Technology Corporation, Danbury, Conn.

[21] Appl. No.: 545,577

[22] Filed: Jun. 29, 1990

[51] Int. Cl.$^5$ .................................................. C08F 4/68
[52] U.S. Cl. .................................... 502/107; 502/108; 502/110; 502/112; 502/113; 526/116
[58] Field of Search ............... 502/107, 108, 110, 112, 502/113

[56] References Cited

U.S. PATENT DOCUMENTS

| | | | |
|---|---|---|---|
| 4,508,842 | 4/1985 | Beran et al. | 502/112 |
| 4,525,550 | 6/1985 | Warzelhan et al. | 526/116 |
| 4,530,914 | 7/1985 | Ewen et al. | 502/113 |
| 4,559,318 | 12/1985 | Smith et al. | 502/110 |
| 4,568,659 | 2/1986 | Warzelhan et al. | 502/111 |
| 4,701,432 | 10/1987 | Welborn | 502/113 |
| 4,918,038 | 4/1990 | Samuels et al. | 502/112 |

OTHER PUBLICATIONS

Carrick et al., *JACS*, vol. 82, p. 1502 (1960).
Karol et al., *JACS*, vol. 83, pp. 2654–2658 (1961).
Jacob et al., *Z. anorg. allg. Chem.*, 427, pp. 75–84 (1976).

*Primary Examiner*—Patrick P. Garvin
*Attorney, Agent, or Firm*—John S. Piscitello

[57] ABSTRACT

A supported, electron donor-complexed reduced vanadium$^{(<3)}$/zirconium coimpregnated catalyst possessing enhanced activity, the methods of its manufacture and ethylene polymers of broad molecular weight distribution produced therewith.

53 Claims, No Drawings

COIMPREGNATED VANADIUM-ZIRCONIUM CATALYST FOR MAKING POLYETHYLENE WITH BROAD OR BIMODAL MW DISTRIBUTION

BRIEF DESCRIPTION OF THE INVENTION

Novel latent catalyst compositions, catalyst compositions, methods for making them, and methods for making ethylene polymers, especially ethylene polymers with a broad or bimodal molecular weight distribution. The featured catalyst compositions comprise vanadium and zirconium compounds coimpregnated on a support.

BACKGROUND TO THE INVENTION

For many applications, polyethylene with enhanced toughness, strength, and environmental stress cracking resistance is important. These enhanced properties are more readily attainable with high molecular weight polyethylene. However, as the molecular weight of the polymer increases, the processibility of the resin usually decreases. By providing a polymer with a broad or bimodal molecular weight distribution, the properties characteristic of high molecular weight resins are retained and processibility, particularly extrudability, is improved. A bimodal molecular weight distribution can be explained as follows: in a traditional molecular weight distribution plot (by size exclusion chromatography) of concentrations of species of specific molecular weight vs. log molecular weight, a multimodal molecular weight distribution would show at least two maxima, two maxima being the characteristic of bimodal. The maxima need not be equivalent in magnitude or widely separated. A broad molecular weight distribution is a representation of a similar area under the plot without the clear presence of two maxima.

Three major strategies have been proposed for the production of polyethylene resins with a broad or bimodal molecular weight distribution. One is post reactor or melt blending, which suffers from the disadvantages brought on by the requirement of complete homogenization and attendant high cost. A second is through the use of multistaged reactors, which raises questions of efficiency and, again, cost. The third, and most desirable strategy, is the direct production of a broad or bimodal polyethylene via a single catalyst or catalyst mixture in a single reactor. Such a process would provide the component resin portions of the molecular weight distribution system simultaneously in situ, the resin particles being intimately mixed on the subparticle level.

In U.S. Pat. No. 4,918,038, there is described a single reactor catalytic process for the production of polyethylene resin having a broad and/or bimodal molecular weight distribution. That process utilizes a mixed catalyst system comprising:

(a) the reaction product of
(i) a vanadium halide having the formula $$VX_3$$

wherein X is chlorine, bromine, or iodine and each X is alike or different;
(ii) a modifier having the formula $$BX_3 \text{ or } AlR_{(3-a)}X_a$$

wherein X is as defined above; R is an alkyl radical having 1 to 14 carbon atoms; each R is alike or different; and a is 0, 1, or 2 and
(iii) an electron donor, which is a liquid Lewis base in which the vanadium halide and modifier are soluble;
(b) one of the following:
(i) a complex having the formula $$ZrMg_bX_c(ED)_d$$

wherein X is as defined above; ED is an electron donor, which is liquid Lewis base in which the precursors of the complex are soluble; b is a number from 1 to 3; c is a positive number equal to or less than 4+2b; and d is a number from 4 to 10; or
(ii) a vanadium oxy compound having the formula $$VOX_3, VOX_2, VOX, \text{ or } VO_2X$$

wherein X is as defined above, or $$VO(OR)_3$$

wherein R is a monovalent hydrocarbon radical having 2 to 10 carbon atoms and each R can be alike or different, wherein the vanadium halide and the vanadium oxy compound are supported;
(c) a halocarbon promoter having the formula $$R_eCX_{(4-e)}$$

wherein R is hydrogen or an unsubstituted or halo substituted alkyl radical having 1 to 6 carbon atoms; each R is alike or different; X is chlorine, bromine, iodine, or fluorine; each X is alike or different; and e is 0, 1, or 2 provided that, if no fluorine is present, e is 2.

According to said patent,
an advantage of the process is the ability to control the molecular weight distribution of the resulting polyethylene;
the mixed catalyst system used in the process is a mixture of two or more component catalysts, each having a different hydrogen response; therefore
if the difference in hydrogen response between the two component catalysts is very large, then the polymer produced by the mixed catalyst system will have a bimodal molecular weight distribution; but
if the difference in hydrogen response between the component catalysts is large, but not sufficient to produce a product with a bimodal molecular weight distribution, the mixed catalyst system will yield a product with a higher concentration of polymer chains above 500,000 molecular weight than is typically observed for a broad molecular weight distribution product of similar melt index.

Beran et al., U.S. Pat. No. 4,508,842, patented Apr. 2, 1985, describe an ethylene polymerization catalyst comprising a supported precursor of vanadium trihalide/electron donor complex and alkylaluminum or boron halides, when combined with alkylaluminum cocatalyst and alkyl halide promoter, provides enhanced polymerization and productivity plus a superior polyethylene product.

Beran et al. polymerizes ethylene with or without at least one $C_3$ to $C_{10}$ alpha-olefin monomer in the gas phase at a temperature between about 30° C. to about 115° C. wherein the monomers are contacted with a catalyst composition comprising a supported precursor vanadium compounds and aluminum alkyl containing modifiers which are impregnated on a solid, inert carrier. The catalysts utilized by Beran et al. differentiate in comprising a supported precursor, a cocatalyst and a promoter in which the supported precursor is a vanadium compound and modifier impregnated on a solid, inert carrier. The vanadium compound in the precursor is the reaction product of a vanadium trihalide and an electron donor. The halogen in the vanadium trihalide is chlorine, bromine or iodine, or mixtures thereof. A particularly preferred vanadium trihalide is vanadium trichloride, $VCl_3$. The electron donor is a liquid, organic Lewis base in which the vanadium trihalide is soluble. The electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof. Preferred electron donors are alkyl and cycloalkyl ethers, including particularly tetrahydrofuran. Between about 1 to about 20, preferably between about 1 to about 10, and most preferably about 3 moles of the electron donor are complexed with each mole of vanadium used.

There is substantial literature indicating the creation of a catalytically active vanadium by the reduction of vanadium halides to the divalent state. Carrick et al., *JACS*, vol. 82, p. 1502 (1960) describe the reduction of $VCl_4$ to the divalent state form of the vanadium ethylene catalyst utilizing the conventional reducing agents, such as triisobutylaluminum and zinc alkyls. Karol et al., *JACS*, vol 83, pp. 2654–2658 (1961) discusses the partial and total reduction of vanadium halides such as $VCl_4$ to divalent structures and the catalytic activity resulting with respect to the polymerization of ethylene to polyethylene.

Jacob et al., *Z. anorg. allg. Chem.*, 427, pp. 75–84 (1976) illustrate the complexity of such reduction reactions with the presence of THF. From the teachings of Beran et al., the resulting divalent vanadium compounds are complexes which include THF in the structure.

Cumulative to the above, Smith et al., U.S. Pat. No. 4,559,318, patented Dec. 17, 1985, describe a number of procedures for making $VX_2$, where X is halogen, which involves the reduction of $VX_4$ or $VX_3$ by reaction with reducing agents followed by the complexation of the $VX_2$ with an ether such as THF. Such is provided on a support surface.

THE INVENTION

This invention is directed to a supported, electron donor-complexed reduced vanadium$^{(<3)}$/zirconium coimpregnated catalyst possessing enhanced activity, the methods of its manufacture and ethylene polymers of broad molecular weight distribution produced therewith. In forming the catalyst, there is employed a reduced vanadium compound. In the terms of this invention, vanadium compounds are divided between non-reduced and reduced. This arbitrary designation is chosen so as to distinquish between vanadium$^{(+3\ and\ +4)}$ compounds, which are termed the non-reduced species, and vanadium compounds which have a lower valence state, including vanadium compounds that possess such a lower valence state as well as vanadium$^{(+3\ and\ +4)}$ compounds, which are termed the reduces species. Such reduced vanadium compounds are characterized by the formula vanadium$^{(<3)}$.

The coimpregnated catalysts of the invention involve the deposition on the same support surface of a reduced vanadium and zirconium intercomplexed catalyst such that there is provided an active catalyst for the production of ethylene polymers possessing a broad molecular weight distribution, especially distributed more to higher molecular weight components, most typically possessing a bimodal molecular weight distribution. The coimpregnated catalysts of the invention comprises the provision of (1) the combination of a reduced vanadium compound with a zirconium organooxy compound on an active carrier (support) material complexed with an electron donor to form a latent catalyst composition; and (2) the impregnation of the latent catalyst composition with a Group 13 (new notation of the Periodic Table Of The Elements, see Chemical and Engineering News, 63(5), 27, 1985)[1] element activating composition or compound.

1. As noted in CRC Handbook of Chemistry and Physics, 67th Edition, CRC Press Inc., Boca Raton, Fla., inside frontcover.

The catalysts of the invention are produced by various procedures, detailed below. These procedures include inter alias (i) A multisequential impregnation procedure involving (a) sequentially impregnating an active carrier (support) material with a liquid compound which is or contains a vanadium$^{(+3\ and\ higher)}$ compound followed by the reduction on the support of the vanadium compound by the deposition of a liquid reducing agent and effecting the formation of a reduced vanadium$^{(<3)}$ compound on the support surfaces or the provision otherwise of such reduced vanadium$^{(<3)}$ compound on the support surfaces, (b) depositing a liquid zirconium organooxy compound onto the support, (c) providing an electron donor compound for the intercomplexation of the vanadium and zirconium compounds on the support surfaces, (d) drying the sequentially impregnated support to form a flowing powder, and (e) impregnating the dried sequentially impregnated support with a Group 13 element-containing activating composition or compound.

(ii) A two step impregnation procedure involving coincidental impregnation in one step followed by a sequential impregnation, comprising (a) independently reducing a liquid vanadium$^{(+3\ and\ higher)}$ to a vanadium$^{(<3)}$ compound, (b) forming a liquid mixture of the vanadium$^{(<3)}$ compound with a zirconium organooxy compound, which mixture contains an electron donor compound for the intercomplexation of the vanadium and zirconium in the mixture, (c) coincidentally impregnating the support with the liquid mixture of (ii)(b), (d) drying the support to form a flowing powder, and (e) impregnating the dried coincidentally impregnated support with the Group 13 element-containing activating composition or compound.

This invention is directed to a further improvement in the coimpregnated V/Zr catalyst of the invention which comprises subjecting the coimpregnated catalyst to preactivation which serves the purpose of selectively activating the zirconium component of the catalyst and results in enhancing in a dramatic fashion the broadening of the molecular weight distribution of the polyethylene in a single reactor polymerization. Preactivation allows for the use of higher V/Zr proportions in the catalyst which gives higher polymerization activities and good melt index response without sacrificing melt flow ratio. The preactivation step involves subjecting the coimpregnated catalyst of the invention to heat treatment in a solution of a hydrocarbon solvent (preferably an aliphatic hydrocarbon), an aluminum alkyl (such as characterized below for the cocatalyst and/or the modifier), promoter (such as illustrated below), and an alpha-olefin (such as $C_{1-12}\alpha$-olefins). The heat treatment involves heating the coimpregnated catalyst to a temperature above 25° C. for a sufficient time so as to raise the activity of the coimpregnated catalyst in polymerizing ethylene. In the preferred practice, the heat treatment of the coimpregnated catalyst is conducted at temperatures of about 50° C. to about 100° C., with higher and lower temperatures being suitable when correlated with time.

The invention encompasses a catalyst composition comprising a. a catalyst composition comprising a reduced vanadium compound and a zirconium organooxy compound codeposited on an active carrier material and complexed with an electron donor material, and treated with a Group 13 element activating composition or compound, b. an aluminum alkyl cocatalyst, and c. a halogenated organic promoter, The invention is directed to improvements in the process of making ethylene polymers comprising ethylene homopolymers and ethylene copolymers, especially homopolymers and copolymers possessing a broadened (preferably bimodal) molecular weight distribution. The process is effected by feeding ethylene reactant, alone or with one or more $\alpha$-olefins, as is well known in the art, to a catalyst, as described, formed from a. a reduced vanadium compound and a zirconium organooxy compound codeposited on an active carrier material and complexed with an electron donor material, and treated with a Group 13 element activating composition or compound, b. an aluminum alkyl cocatalyst, and c. a halogenated organic promoter, under standard ethylene polymerization conditions such that the ethylene polymer is formed. Polymerization may be effected by bulk, suspension or fluid bed procedures well known in the art, though the polymerization process of this invention is preferably carried out in a fluid bed. The process is desirably carried out in a single-stage reactor but it may also be carried out in a staged reactor assembly incorporating two or more reactors in series. The process is particularly suitable for the manufacture of ethylene polymers of broadened molecular weight distribution, especially ethylene polymers possessing a bimodal molecular weight distribution.

DETAILED DESCRIPTION OF THE INVENTION

As pointed out above, for many applications, polyethylene with enhanced toughness, strength, and environmental stress cracking resistance is important; and it is recognized that these enhanced properties are more readily attainable with high molecular weight polyethylene. In addition, it is also recognized that as the molecular weight of the polymer increases, the processibility of the resin usually decreases, consequently, the art has sought to resolve the dilemma by providing a polymer with a broad or bimodal molecular weight distribution, such that the properties characteristic of high molecular weight resins are retained and the processibility, particularly extrudability, is improved. The art has entertained a number of ways to attain production of polyethylene resins with a bimodal molecular weight distribution. One is post reactor or melt blending, which suffers from the disadvantages brought on by the requirement of complete homogenization and attendant high cost. A second is through the use of multistage reactors, which raises questions of efficiency and, again, cost. The third, and most desirable strategy, is the direct production of a broad or bimodal polyethylene via a single catalyst or catalyst mixture in a single reactor. Such a process would provide the component resin portions of the molecular weight distribution system simultaneously in situ, the resin particles being intimately mixed on the subparticle level.

This invention has the advantage of producing, inter alias, broad or bimodal molecular weight polyethylene via the single catalyst route in a single reactor, or the use of the same catalyst in a multistage reactor system wherein the catalyst maybe employed in one or all of the reactors of the multistage reactor system. In addition, the invention provides a catalyst system which avoids the problem of nonhomogeneity of the resultant ethylene polymer and optimizes the polymer's physical properties. The catalyst system of this invention has the advantage of distribution of the catalyst components together on the same support surface by virtue of coimpregnation and this results in a catalyst system which is overall more homogeneous as contrasted with a blended catalyst in which different components are deposited on different substrate surfaces. As a result, the catalysts of the invention provide ethylene polymers possessing greater property uniformity.

The Catalytic Components

The Vanadium Compounds

The vanadium compound is a reduced vanadium halide that suffices to provide a supported, electron donor-complexed reduced vanadium$^{(<3)}$/zirconium coimpregnated catalyst. The vanadium compound is a reduced vanadium halide form having a valence state less than $+3$ that is complexed with an electronic donor compound. In the preferred case, the vanadium halide is a vanadium dihalide and may comprise a mixed vanadium halide in which a major molar portion has a valence state of 2. The halogen in the vanadium dihalide is chlorine, bromine or iodine, or mixtures thereof. A particularly preferred vanadium dihalide is vanadium dichloride, $VCl_2$.

The amount of vanadium present in the catalyst is not narrowly critical. Typically, the amount of vanadium present, on a molar basis, is from about 0.10 to about 0.80 millimoles of vanadium per gram of solid supported catalyst, preferably, from about 0.20 to about 0.40 millimoles of vanadium per gram of solid supported catalyst.

A convenient method for obtaining the reduced vanadium halide is to treat a vanadium trihalide such as VCl$_3$, with an activator composition. Suitable activators are those compositions characterized by Beran et al. to be modifier compositions.

The Zirconium Cocatalyst

The zirconium organooxy compound cocatalyst of the invention has the formula:

$$Zr(OR')_4 \qquad (II)$$

wherein R' are one or more of an alkoxy or acyloxy group, such as alkoxy -OR or acyloxy -OC(O)R, where R is as previously defined. Illustrative of such zirconium organooxy compounds are those of the following formula:

(CH$_3$O)$_4$Zr (CH$_3$CH$_2$O)$_4$Zr (CH$_3$CH$_2$CH$_2$O)$_4$Zr (CH$_3$CH$_2$CH$_2$O)$_2$(CH$_3$O)$_2$Zr (CH$_3$C(O)O)$_4$Zr (CH$_3$CH$_2$C(O)O)$_4$Zr (CH$_3$CH$_2$CH$_2$O)$_3$(CH$_3$C(O)O)Zr (CH$_3$CH$_2$CH$_2$O)$_2$(CH$_3$C(O)O)$_2$Zr (CH$_3$C(O)O)$_3$(CH$_3$CH$_2$CH$_2$O)Zr $\overset{CH_3}{(CH_3CHO)_4Zr}$ $\overset{CH_3}{\underset{CH_2}{(CH_3CHO)_4Zr}}$ (CH$_3$CH$_2$CH$_2$CH$_2$CH$_2$CH$_2$CH$_2$O)$_4$Zr Preferred zirconium organooxy compounds cocatalysts are the C$_1$ to C$_8$ tetralkoxyzirconium compounds such as illustrated above.

The amount of the zirconium organooxy compounds in the catalyst composition is not narrowly critical. Useful amounts of the zirconium organooxy compound to the reduced vanadium catalyst on the support (carrier) may range from about 0.15 to about 5 mmoles of zirconium (Zr) for each mmole of vanadium (V) on the support. Preferably, the amount of zirconium, same basis, is from 0.25 to 2 mmoles for each mmole of vanadium.

The Electron Donor

The electron donor is a liquid, organic Lewis base in which the vanadium halide and zirconium organooxy compound are soluble. The electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof. Preferred electron donors are alkyl and cycloalkyl ethers, including particularly tetrahydrofuran (THF). Between about 0.10 to about 20.0, preferably between about 0.2 to about 10.0, and most preferably about 0.5 to about 10.0 moles of the electron donor are complexed with each mole of combined vanadium$^{(<3)}$/zirconium.

The Activating Composition

The activating composition used in forming the catalyst of this invention has the formula:

$$MeR^o{}_{(3-a)}X_a \qquad (III)$$

wherein Me is an element from Group 13, including boron, aluminum, gallium, indium and tantalum, preferably boron and aluminum, each R$^o$ is independently alkyl provided that the total number of aliphatic carbon atoms in any one R$^o$ group may not exceed 14; X is chlorine, bromine or iodine; and a is 1, 2 or 3. Illustrative compounds are the following:

AlCl$_3$

BCl$_3$

AlBr$_3$

BBr$_3$

AlF$_3$

BF$_3$

CH$_3$BCl$_2$ (CH$_3$CH$_2$)$_2$BCl

CH$_3$CH$_2$CH$_2$BCl$_2$

CH$_3$CH$_2$CH$_2$(CH$_3$)BCl

CH$_3$CH$_2$AlCl$_2$ (CH$_3$CH$_2$)$_2$AlCl

CH$_3$CH$_2$CH$_2$AlCl$_2$ (CH$_3$CH$_2$CH$_2$)$_2$AlCl (CH$_3$)$_2$AlCl (CH$_3$CH$_2$CH$_2$)$_2$AlCl $\overset{CH_3}{CH_3CHAlF_2}$ $\overset{CH_3}{\underset{CH_2}{(CH_3CH)_2AlCl}}$ CH$_3$CH$_2$CH$_2$CH$_2$AlCl$_2$ Preferred compositions include C$_1$ to C$_6$ alkylaluminum mono- and dichloride and/or aluminum trichloride. A particularly preferred composition is ethyl aluminum dichloride. About 2 to about 25, and preferably about 5 to about 10, mmoles of the activator are used per number of mmoles of zirconium in the catalyst.

The Solid, Inert Carrier

The carrier is a solid, particulate porous material inert to the polymerization and desirably, is a siliceous containing particulate material. The carrier, or support, is typically a silica, alumina or aluminosilicate, i.e., oxides of silicon or aluminum or mixtures thereof, containing material. Optionally, the carrier may contain additional materials such as zirconia, thoria or other compounds chemically inert to the polymerization. The carrier is used as a dry powder having an average particle size of between about 10 to 250, preferably about 20 to about 200, and most preferably about 30 to about 100 microns. The porous carrier has a surface area of greater than or equal to about 3 and preferably greater than or equal to about 50 m$^2$/g. A preferred carrier is silica having pore sizes of greater than or equal to about 80, and preferably greater than or equal to about 100 angstroms. The carrier is predried by heating to remove water, preferably at a temperature of greater than or equal to about 600° C.

The amount of carrier used is that which will provide a vanadium content of between about 0.05 to about 1.0 mmoles of vanadium per gram of precursor (mmole V/g), and preferably between about 0.2 to about 0.55 mmole V/g, and most preferably about 0.5 mmole V/g.

The Magnesium Halide

Suitable in the preparation of the catalyst, there may be optionally provided a magnesium halide. Suitable magnesium halides are those of the formula:

$$MgX_2 \quad (IV)$$

wherein is defined above. Illustrative magnesium halides include $MgCl_2$, $MgI_2$ and $MgBr_2$.

The Aluminum Cocatalyst

The cocatalyst is an aluminum alkyl such as those of the formula:

$$AlR_3 \quad (V)$$

wherein R is as previously defined. Preferred cocatalysts include $C_2$ to $C_8$ trialkylaluminum compounds. A particularly preferred cocatalyst is triisobutyl aluminum. Between about 5 to about 500, and preferably between about 10 to about 30 moles of cocatalyst are used per mole of vanadium.

The Promoter

The promoters used in the practice of the invention may be halogenated organic compounds, typically of two types, one which is supplied with the cocatalyst and is not part of the catalyst per se, and another which is a molecularly structural component of the catalyst and thus is not separately fed to the polymerization reaction, but instead is part of the catalyst composition fed to the reaction. The latter is termed a bound promoter while the former is simply termed promoter.

Promoter

The promoter is a halogenated organic compound such as a halohydrocarbon of the formula:

$$R'_b CX'_{(4-b)} \quad (VI)$$

wherein R' is hydrogen or unsubstituted or halosubstituted lower alkyl, i.e., up to about $C_6$ containing alkyl; X' is halogen; and b is 0, 1 or 2. Preferred promoters include flouro, chloro or bromo substituted ethane or methane having at least 2 halogens attached to a carbon atom. Preferred promoters include $CCl_4$, $CHCl_3$, $CH_2Cl_2$, $CBr_4$, $CFCl_3$, $CH_3CCl_3$, and $CF_2ClCCl_3$. Particularly preferred promoters are fluorotrichloromethane [Freon] ($CFCl_3$), methylene dichloride ($CH_2Cl_2$), methylene dibromide ($CH_2Br_2$), 1,1,1, trichloroethane, ($CH_3CCl_3$), and chloroform ($CHCl_3$). Between about 0.1 to about 10, and preferably between about 0.2 to about 2, moles of promoter are used per mole of cocatalyst.

The Bound Promoter

The bound promoter comprises the haloalcohol metalate moiety of the structural formula:

$$\underset{-Me-O-R^0R^\lozenge_b CX^0_{(3-b)}}{(|)_x} \quad (VII)$$

wherein Me is a metal such as those from Groups 1, 2, 12 and 13 (new notation) of the Periodic Table Of The Elements[2] and includes, for example, the alkali metals (lithium, sodium, potassium, rubidium and cesium), the alkaline earth metals (beryllium, magnesium, calcium, strontium and barium), zinc, cadmium, mercury, boron, aluminum, gallium, indium, tantalum, and the like; or Me is a silicon of siloxy unit of the carrier, where the carrier is silica containing, as derived from the in situ reaction of one such other haloalcohol metalates with silanol groups on the surface of the silica carrier; x is equal to the remaining valences of Me; $R^\lozenge$ is hydrogen, unsubstituted or halosubstituted lower alkyl, i.e., up to about $C_6$ containing alkyl, aromatic such as phenyl, benzyl, and the like, or cycloalkyl, b is 0 or 1, $X^0$ is one of chlorine, bromine, fluorine or iodine, and $R^o$ is a divalent organic group bonded to both the 0 and to the CX' moieties. $R^o$ may be aliphatic or aromatic.

[2]. See CRC Handbook of Chemistry and Physics, 67th Edition, CRC Press Inc., Boca Raton, Fla., inside front cover.

Additional disclosure about bound promoters can be found in copending application Ser. No. 502,678, filed Apr. 2, 1990, and its disclosure on bound promoters is incorporated herein by reference.

Catalyst Preparation

The first step in catalyst preparation is the provision of an electron donor complexed reduced vanadium halide on a support surface. This is accomplished in a number of ways. For example, catalyst preparation typically involves a plurality of steps including the deposition of a vanadium$^{(+3 \text{ and higher})}$ halide or higher valenced compound with the electron donor compound onto an active carrier (support) followed by the deposition onto the same carrier of a reducing or activating agent which causes the vanadium$^{(+3)}$ compound to be reduced to a vanadium$^{(<3)}$ compound. The vanadium containing support is thereafter impregnated in a variety of ways to incorporate the modifier, the zirconium organooxy compound, and the like. Standard catalyst impregnation equipment are employed in each of the impregnation and drying steps of catalyst manufacture. As a rule, each impregnation is followed by a mild drying step to assure the removal of solvent for the impregnants.

For example, in one embodiment, the vanadium compound is prepared by dissolving a vanadium trihalide in the electron donor at a temperature between about 20° C. up to the boiling point of the electron donor for a few hours. Preferably, mixing occurs at about 65° C. for about 3 hours. The vanadium compound so produced is then impregnated onto the carrier. Impregnation may be effected by adding the carrier as a dry powder or as a slurry in the electron donor or other inert solvent. The liquid is removed by drying at less than about 100° C. for a few hours, preferably between at about 45° to 70° C. for about 3 to 6 hours. The modifier, either reacted with the haloalcohol or not, is dissolved in an inert solvent, such as a hydrocarbon, and is then mixed with the vanadium impregnated carrier. The liquid is removed by drying at temperatures of less than about 70° C. for a few hours, preferably at about 45° C. for about 3 hours. The zirconium cocatalyst is added to the supported precursor. The aluminum cocatalyst is added to the supported precursor (containing the zirconium compound or before the zirconium compound is added) either before and/or during the polymerization reaction. The cocatalyst is preferably added separately as a solution in inert solvent, such as isopentane, during polymerization.

The supports for these applications are dried to remove the free water and much of the bound water. Drying the support typically requires heating the support as a fluid bed using an inert atmosphere such as air, carbon dioxide or nitrogen, for about four (4) hours and longer, such as 6–10 hours, at 600°–800° C., followed by purging with nitrogen.

Polymerization

The reactants used in the polymerization may be ethylene alone or with one or more α-olefins, as well known in the art. Illustrative α-olefins include propylene, 1-butene, 1-hexene, 1-octene, and the like. The polymerization may encompass elastomeric ethylene-alpha-$C_3$–$C_{18}$ olefin copolymers encompass ethylene-propylene copolymers (EPR) (inclusive of EPM or EPDM copolymers), ethylene-butene copolymers, and the like. Illustrative of such polymers are those comprised of ethylene and propylene or ethylene, propylene and one or more dienes. Copolymers of ethylene and higher alphaolefins such as propylene often include other polymerizable monomers, such as non-conjugated dienes, illustrated by the following:

straight chain acyclic dienes such as: 1,4-hexadiene, 1,6-octadiene, and the like;

branched chain acyclic dienes such as: 5-methyl-1,4-hexadiene, 3,7-dimethyl-1,6-octadiene, 3,7-dimethyl-1,7-octadiene and the mixed isomers of dihydromyrcene, dihydroocinene, and the like;

single ring alicyclic dienes such as: 1,4-cyclohexadiene, 1,5-cyclooctadiene, 1,5-cyclododecadiene, and the like;

multi-ring alicyclic fused and bridged ring dienes such as: tetrahydroindene, methyltetrahydroindene, dicyclopentadiene, bicyclo(2,2,1)-hepta-2,5-diene, alkenyl, alkylidene, cycloalkenyl and cycloalkylidene norbornenes such as 5-methylene-2-norbornene (MNB), 5-ethylidene-2-norbornene (ENB), 5-propyl-2-norbornene, 5-isopropylidene-2-norbornene, 5-(4-cyclopentenyl)-2-norbornene, 5-cyclohexylidene-2-norbornene, and the like.

The ethylene polymerization is conducted in the gas phase using well established procedures in the art. It is preferred to polymerize in a continuous, fluidized bed. In a continuous process of this type, portions of the catalyst composition containing the promoter, along with the cocatalyst, and monomers are fed to a reactor vessel from which ethylene polymer product is continuously removed. With respect to ethylene copolymers, their density may be controlled and varied over a wide range, if desired, depending upon the amount of alpha-olefin comonomer addition and upon the particular comonomer employed. Lower densities are obtained with greater mole percent of alpha-olefin added to the polymerization as a polymerizate.

Polymerization is conducted at a temperature below the sintering of the ethylene polymer product. The operating temperature will range from between about 30° C. to about 115° C. Preferred operating temperatures will vary depending upon the polyethylene density which is desired. High density polyethylenes of greater than about 0.94 g/cc are produced at operating temperatures of between about 90° C. to about 110° C., and preferably at about 100° C. Low density polyethylenes ranging in density from about 0.91 to about 0.94 g/cc are preferably produced at an operating temperature of between about 75° C. to about 90° C. Very low density polyethylenes of less than about 0.91 g/cc are preferably produced at an operating temperature of between about 35° C. to about 75° C., using procedures as described in copending U.S. patent application Ser. No. 281,927, filed Dec. 6, 1988, by Karol et al., entitled "Preparation of Low Density, Low Modulus Ethylene Copolymers in a Fluidized Bed". Fluid bed reactors are typically operated at pressures of up to about 1000 psi and preferably between about 50 to about 350 psi.

The properties of the polymers produced in the examples were determined by the test procedures:

| Property | Test Procedure |
|---|---|
| Bulk Density ($kg/m^3$) | ASTM-D-1895 (Method B). |
| Density (g/cc) | ASTM-1505, based on ASTM-D-1928 (Procedure C) plaque preparation |
| Flow Index (dg/min) | ASTM D-1238-Condition F |
| Melt Flow Ratio | Flow Index/Melt Index; with melt index measured using ASTM D-1238 Condition E. |
| CHMS | Weight percent of high molecular weight (>500,000) component in polyethylene as determined from size exclusion chromatographic analysis. |
| CLMS | Weight percent of concentrated low molecular weight (<$10^3$) component in polyethylene as determined from size exclusion chromatographic analysis. |
| Dart Impart | ASTM D-1709 |
| Tear MD | ASTM D-1922 |
| Tear TD | ASTM D-1922 |
| Puncture | WC 68L |

Abbreviations used in the Examples are defined as follows:

| Designation | Description |
|---|---|
| DEAC | Diethylaluminum chloride |
| FI | Flow index |
| MFR | Melt flow ratio |
| STY | Space time yield |
| TEAL | Triethylaluminum |
| THF | Tetrahydrofuran |
| TIBA | Triisobutylaluminum |
| DI | Dispersity index, $M_w/M_n$ |
| FAR | Film Appearance Rating |

EXAMPLES

EXAMPLE 1

Vanadium Precursor Preparation

To a flask containing 4 liters of anhydrous THF are added 34 grams $VCl_3$ (0.216 moles). The mixture is stirred for 5 hours at 65° C. under a nitrogen blanket until the $VCl_3$ is dissolved. To this solution are added 550 grams of silica (dehydrated by heating to 600° C. followed by chemical treatment with 5.5 wt % triethylaluminum) and stirring is continued for 4 hours at 65° C. The flask is vented and the solution is dried to the mud stage at 70° C. The temperature is dropped to 45° C. and a nitrogen purge is used for 6 hours or until a 4–10% by weight THF level is reached in the resulting precursor. The vanadium compound so produced is a free flowing solid which has 0.39 mmoles of vanadium per gram of vanadium compound. The solid (Catalyst A) is removed from the flask and stored under nitrogen.

To a flask containing 4 liters of anhydrous isopentane are added 500 grams of Catalyst A. To this mixture is added, with stirring, a 25 wt. % solution of diethylaluminum chloride as modifier, in anhydrous hexane. The amount of diethylaluminum chloride employed was in an amount sufficient to give 4% by wt. Al in the final dried solid. The mixture is heated to 45° C. and purged with nitrogen for three hours or until the product is a free flowing powder (Catalyst B).

Coimpregnated Catalyst Preparation

To a flask containing 0.226 g $MgCl_2$ (2.5 mmol) dissolved in 30 ml THF are added 10 grams of Catalyst B and the mixture is stirred at room temperature until the dark green color of the reduced $V^{<3}$ species appears (typically in 1 hour). The THF is evaporated under vacuo at 65° C. until a pale green free flowing powder is obtained. This is suspended in 35 ml hexane and 0.96 ml (3.06 mmol) zirconium tetra-n-propoxide is added. The mixture is stirred for 30 minutes, then evaporated under vacuo at 65° C. to give Catalyst C. Elemental analysis shows 0.229 mmol Mg/g, 0.387 mmol V/g and 0.233 mmol Zr/g solid. The V/Zr molar ratio is 1.66.

To a flask containing 2.8 g of Catalyst C are added 10 ml hexane and 3.7 ml (5.9 mmol) of 25 wt % solution of ethylaluminum dichloride in hexane such that the ethylaluminum dichloride/Zr molar ratio is 9. The mixture is stirred for 45 minutes, followed by filtration or decantation, washed once with 10 ml hexane and dried until a free flowing yellow powder is obtained (Catalyst D). Elemental analysis showed 0.17 mmol Mg/g, 0.24 mmol V/g and 0.12 mmol Zr/g. The V/Zr ratio is 2.0.

EXAMPLE 2

Additional catalysts can be prepared using the above preparative method where the V/Zr ratio is varied. The same preparation method can be repeated where 0.454 g $MgCl_2$ (4.98 mmol) is dissolved in 40 ml THF and 10 g Catalyst B added until appearance of the green color is observed. The THF is evaporated under vacuo at 65° C. until a pale green free flowing powder is obtained. This is suspended in 35 ml hexane and 1.6 ml zirconium tetra-n-propoxide are added. The same stirring and evaporation step gave Catalyst E. Elemental analysis shows 0.39 mmol Mg/g, 0.33 mmol V/g and 0.35 mmol Zr/g solid with V/Zr molar ratio of 0.94. 2.5 g of Catalyst E are suspended in 15 ml hexane and 4.43 ml ethylaluminum dichloride are added (7 mmol) such that the ethylaluminum dichloride/Zr molar ratio is 8. The reaction is allowed to proceed for 1 hour followed by isolation and drying to give Catalyst F. Elemental analysis shows 0.35 mmol Mg/g, 0.29 mmol V/g and 0.246 mmol Zr/g solid with a V/Zr molar ratio of 1.18.

EXAMPLE 3

An alternative preparative method involved deletion of the $MgCl_2$ to give coimpregnated V/Zr catalyst. Ten (10) grams of Catalyst A are slurried in 25 ml THF until the green color of the $V^{<3}$ species is observed. Then 0.95 ml Zr tetra-n-propoxide (3.06 mmol) is added with stirring for 30 minutes, followed by evaporation under vacuo as described above, to give a pale green powder (Catalyst G). Elemental analysis shows 0.34 mmol V/g and 0.21 mmol Zr/g solid [V/Zr=1.64]. Catalyst G (2.5 grams) is slurried in 15 ml hexane and 3.8 ml ethylaluminum dichloride (6 mmol) are added such that the ethylaluminum dichloride/Zr molar ratio was 11.4. Reaction is continued for 1 hour, followed by isolation of a yellow powder (Catalyst H) analyzing for 0.285 mmol V/g and 0.172 mmol Zr/g solid [V/Zr=1.66].

EXAMPLE 4

In a 100 gallon mixtank is charged 300 pounds of dry THF and 4 kg of $VCl_3$ and the contents of the tank are heated to 65°-70° C. until the $VCl_3$ is dissolved. Triisobutylaluminum (20 weight % solution in hexane) is added to the tank such that the Al/V molar ratio in the tank is 6. After the addition of the triisobutylaluminum, the elevated temperature 65°-70° C. for 45 minutes. Then the contents of the tank are charged into a 125 gallon reactor containing 125 lbs of hot silica at 50°-60° C. The solution and the hot silica are mixed at elevated temperatures for 1 hour, followed by drying as was done for Catalyst A to give a free flowing solid (Catalyst I). Elemental analyses of Catalyst I show 15% THF, 0.24 mmol V/g solid, and 1.575 mmol Al/g.

EXAMPLE 5

To a 3 gallon mixtank is charged 1230 g of Catalyst I and 3870 mls of THF. The mixture is agitated for 1-2 hours at 65° C. until the green color of the $V^{<3}$ appears. Then 138 mls of Zr(n-propoxide)$_4$ are added and stirring is continued for another 30 minutes at 65° C. The contents of the tank are dried using the same procedure recited above. A pale green solid (Catalyst J) precursor is obtained.

EXAMPLE 6

The precursor, Catalyst J, is converted to catalyst with ethylaluminum dichloride as follows: 466 g of Catalyst J are slurried in 1165 mls isopentane and sufficient ethylaluminum dichloride added (1354 mls) such that the ethylaluminum dichloride/Zr molar ratio is 10. Reaction proceeds for 1 hour at 25°-30° C. followed by decantation, washing with fresh isopentane, decantation and drying to give a free flowing powder (Catalyst K). Elemental analyses show 0.30 mmol V/g, 0.22 mmol Zr/g with a V/Zr ratio of 1.36.

EXAMPLE 7

Catalysts L and M are prepared similar to K except that the V/Zr ratios are varied. Elemental analyses for Catalyst L (blend of 3 batches) show a V/Zr molar ratio between 1.4-1.6 and Catalyst M shows a V/Zr ratio of 0.91.

EXAMPLE 8

To the 3 gallon mixtank are added 956 g of Catalyst I and 3849 mls of THF. The mixture is stirred for 1-2 hours at 65° C. until the green color of $V^{<3}$ appears. Then 122 mls of zirconium (n-propoxide)$_4$ are added and stirring is continued for 30 additional minutes at 65° C. The contents are dried as described above, and a pale green solid (Catalyst N) precursor is obtained. Elemental analysis shows 0.20 mmol Zr/g solid, 0.2335 mmol V/g solid, and a V/Zr molar ratio of 0.80.

EXAMPLE 9

Catalyst precursor N is converted to catalyst with ethylaluminum dichloride as follows: 810 g of Precursor N are charged to a 3 gallon mixtank with 2025 mls of isopentane and sufficient ethylaluminum dichloride added (1421 mls) such that the ethylaluminum dichloride/Zr ratio is 5. Reaction proceeds for 1 hour at 25°-30° C. followed by evaporative (residue) drying as described above. The result is Catalyst P, a yellow solid containing 0.20 mmol V/g, 0.23 mmol Zr/g, and a V/Zr mole ratio of 0.86.

EXAMPLE 10

A solution is made from 15 ml hexane, 0.51 ml triethylaluminum (from a 25 weight % hexane solution), 0.63 ml CHCl$_3$ (1 molar in hexane) and 1.25 ml 1-octene. The solution is added to 1.0 gram of Catalyst P in a glass bottle, which is thereafter stoppered, placed in a 70° C. water bath, with stirring, for 1 hour. The contents of the bottle are cooled to room temperature and the supernatant is decanted. The solid, Catalyst Q, is washed once with a volume of hexane and dried under vacuum to a yellow orange powder. Catalyst Q's analysis shows 0.312 mmol V/g, 0.352 mmol Zr/g, and a V/Zr molar ratio of 0.88.

EXAMPLE 11

Using the procedure of Example 10, Catalyst R is prepared using a V/Zr molar ratio of 1.71. Elemental analysis of this catalyst shows 0.263 mmol V/g, 0.145 mmol Zr/g, and a V/Zr molar ratio of 1.81.

Slurry Polymerization

Laboratory slurry polymerizations were carried out in a 1 liter autoclave equipped with agitation, temperature control and gas feed streams (hydrogen, nitrogen, ethylene). The ethylene was fed on demand, maintaining a constant total pressure of 160 psig. Cocatalyst type can be either triethylaluminum or triisobutylaluminum, promoter type may be CHCl$_3$, CFCl$_3$ or mixed CFCl$_3$/CH$_2$Cl$_2$ at molar ratios based on total mmol V+Zr charged to the reactor. Copolymerizations used 1-hexene as comonomer. Activity units for the slurry polymerization data are given in grams polyethylene/mmol V+Zr/hr/100 psi ethylene pressure.

The following tables summarize the laboratory slurry polymerizations of the catalysts of the preceding examples.

| Example | 12 | 13 | 14 | 15 | 16 | 17 | 18 |
|---|---|---|---|---|---|---|---|
| Catalyst | D | D | D | B | F | F | F |
| Promoter | CFCl$_3$/CH$_2$Cl$_2$ | CFCl$_3$ | CFCl$_3$/CH$_2$Cl$_2$ | CFCl$_3$ | CFCl$_3$/CH$_2$Cl$_2$ | CFCl$_3$ | CFCl$_3$/CH$_2$Cl$_2$ |
| Cocatalyst | TEAL | TEAL | TIBA | TEAL | TEAL | TEAL | TIBA |
| Al/V + Zr | 70 | 70 | 70 | 70 | 70 | 70 | 70 |
| Promoter/V + Zr | 45/98 | 70 | 35/35 | 70 | 35/70 | 70 | 35/70 |
| V/Zr | 2.0 | 2.0 | 2.0 | — | 1.18 | 1.18 | 1.18 |
| Polymerization | | | | | | | |
| Temperature (°C.) | 85 | 85 | 85 | 85 | 85 | 85 | 85 |
| Comonomer (mls) | — | 5 | 5 | 5 | — | 5 | 5 |
| Activity | 989 | 1494 | 1788 | 1431 | 472 | 560 | 734 |
| Polyethylene | | | | | | | |
| Density (g/cc) | — | .958 | .960 | .949 | — | .964 | .958 |
| MI(I$_2$) | .13 | .22 | .25 | .12 | .11 | .18 | .12 |
| FI(I$_{21}$) | 23 | 33.4 | 30 | 11 | 39 | 38 | 32 |
| MFR | 185 | 151 | 120 | 95 | 354 | 211 | 267 |
| DI | 18.8 | 23.7 | 24.2 | 19.4 | 36 | 62.1 | 55 |
| % CHMS | 14 | 13.6 | 12.8 | 15.7 | 18.9 | 15.1 | 16.1 |

| Example | 19 | 20 | 21 | 22 | 23 | 24 | 25 | 26 |
|---|---|---|---|---|---|---|---|---|
| Catalyst | H | H | H | H | K | K | K | I |
| Promoter | CFCl$_3$/CH$_2$Cl$_2$ | CFCl$_3$ | CFCl$_3$/CH$_2$Cl$_2$ | CFCl$_3$ | CFCl$_3$ | CFCl$_3$ | CFCl$_3$ | CFCl$_3$ |
| Cocatalyst | TEAL | TEAL | TIBA | TIBA | TIBA | TIBA | TEAL | TEAL |
| Al/V + Zr | 70 | 70 | 70 | 70 | 70 | 70 | 70 | 70 |
| Promoter/V + Zr | 35/70 | 70 | 35/35 | 70 | 70 | 70 | 70 | 70 |
| V/Zr | 1.66 | 1.66 | 1.66 | 1.66 | 1.4 | 1.4 | 1.4 | — |
| Polymerization | | | | | | | | |
| Temperature (°C.) | 85 | 85 | 85 | 85 | 85 | 95 | 85 | 85 |
| Comonomer (mls) | — | 5 | 5 | 5 | 5 | 5 | 5 | 5 |
| Activity | 686 | 803 | 1330 | 1271 | 901 | 1276 | 537 | 2298 |
| Polyethylene | | | | | | | | |
| Density | — | 0.958 | 0.957 | 0.958 | 0.956 | 0.955 | 0.959 | 0.947 |
| MI(I$_2$) | 0.26 | 0.12 | 0.21 | 0.25 | 0.16 | 0.32 | 0.39 | 0.004 |
| FI(I$_{21}$) | 44.4 | 26 | 39 | 38 | 29 | 53 | 65 | 7.4 |
| MFR | 160 | 226 | 189 | 153 | 181 | 166 | 167 | 116 |
| DI | — | 28.7 | — | — | 39.4 | — | 33 | — |
| % CHMS | — | 16.7 | — | — | 17.6 | — | 13.5 | — |

| Example | 27 | 28 | 29 | 30 |
|---|---|---|---|---|
| Catalyst | L | L | M | M |
| Promoter | CFCl$_3$ | CFCl$_3$ | CFCl$_3$ | CFCl$_3$ |
| Cocatalyst | TIBA | TEAL | TEAL | TIBA |
| Al/V + Zr | 70 | 70 | 70 | 70 |
| Promoter/V + Zr | 70 | 70 | 70 | 70 |
| V/Zr | 1.4–1.6 | 1.4–1.6 | .91 | .91 |
| Polymerization | | | | |
| Temperature (°C.) | 95 | 95 | 95 | 95 |
| Comonomer (mls) | 5 | 5 | 10 | 10 |
| Activity | 1099 | 945 | 482 | 628 |
| Polyethylene | | | | |
| Density | 0.953 | 0.958 | | 0.953 |
| MI(I$_2$) | 0.22 | 0.51 | 0.09 | 0.068 |
| FI(I$_{21}$) | 40.2 | 63.2 | 40 | 27 |
| MFR | 181 | 123 | 450 | 400 |
| DI | — | — | 35.3 | 97 |

-continued

|  | % CHMS | — | — | 17.1 | 16.3 |
|---|---|---|---|---|---|

| Example | 31 | 32 | 33 | 34 | 35 | 36 |
|---|---|---|---|---|---|---|
| Catalyst | K | K | L | L | L | M |
| Promoter | $CFCl_3$ | $CFCl_3$ | $CHCl_3$ | $CHCl_3$ | $CHCl_3$ | $CHCl_3$ |
| Cocatalyst | TEAL | TIBA | TIBA | TIBA | TEAL | TEA |
| V/Zr | 1.4 | 1.4 | 1.6 | 1.6 | 1.6 | 0.91 |
| Polymerization |  |  |  |  |  |  |
| Temperature (°C.) | 95 | 95 | 95 | 95 | 95 | 95 |
| Comonomer | Hexene | Hexene | Hexene | Hexene | Hexene | Hexene |
| Comonomer/$C_2$ Ratio | .0045 | .003 | .0005 | .004 | .0008 | .003 |
| $H_2$/Monomer Ratio | .023 | .017 | .04 | .026 | .035 | .03 |
| Polyethylene |  |  |  |  |  |  |
| Density | .945 | .945 | .945 | .942 | .943 | .943 |
| FI($I_{21}$) | 7.5 | 7.1 | 4.7 | 8.6 | 5.4 | 8 |
| MFR($I_{21}/I_5$) | 29 | 34 | 24 | 24 | 25 | 31 |
| Bulk Density | 28.5 | 28.5 | 28 | 29 | 28 | 28.5 |
| Ash (wt %) | .089 | .06 |  | .065 | .072 |  |
| DI | 80 |  | 58 | 50 | 40 | 127 |
| CHMS | 17.6 |  | 22.7 | 17.3 | 18.7 | 20.2 |
| CLMS | 5.95 |  | 4.14 | 5.0 | 3.51 | 9.5 |
| Film Properties |  |  |  |  |  |  |
| Dart Impact, g | 260 | 214 |  | 396 | 371 | 440 |
| mil | (1.0) | (0.5) |  | (0.5) | (0.5) | (1.0) |
| Tear MD | 16.6 | 20 |  | 19 | 15 | 21 |
| TD | 202 | 72 |  | 148 | 101 | 277 |
| Puncture, in-lb/mil | — | 9.7 |  | 10 | 11 | 10 |
| FAR | Exc* |  |  | Exc* | Exc* | P** |
| V, ppm | 15.3 | 11.4 |  | 13.3 | 14.8 | 14.2 |

| Example | 37 | 38 | 39 |
|---|---|---|---|
| Catalyst | P | P | P |
| Promoter | $CFCl_3$ | $CFCl_3$ | $CFCl_3$/$CH_2Cl_2$ |
| Cocatalyst | TIBA | TEA | TIBA |
| Al/V + Zr | 70 | 70 | 70 |
| Promoter/V + Zr | 70 | 70 | 35/35 |
| V/Zr | .86 | .86 | .86 |
| Polymerization |  |  |  |
| Temperature (°C.) | 85 | 85 | 95 |
| Comonomer (mls) | 5 | 10 | 10 |
| Activity | 773 | 645 | 822 |
| Polyethylene |  |  |  |
| Density | .960 | .958 | .950 |
| MI($I_2$) | 0.32 | 0.78 | .32 |
| FI($I_{21}$) | 79 | 133 | 66 |
| MFR | 247 | 171 | 207 |
| DI | 65.5 | 31.1 | — |
| % CHMS | 14.2 | 11 | — |

| Example | 40 | 41 |
|---|---|---|
| Catalyst | P | P |
| Promoter | $CHCl_3$ | $CHCl_3$ |
| Cocatalyst | TEAL | TEAL |
| V/Zr | .86 | .86 |
| Polymerization |  |  |
| Temperature (°C.) | 95 | 85 |
| Comonomer | hexene | hexene |
| Comonomer/C2 Ratio | .0032 | .0032 |
| $H_2$/Monomer Ratio | .018 | .026 |
| Polyethylene |  |  |
| Density | .945 | .947 |
| FI($I_{21}$) | 6.0 | 3.7 |
| MFR($I_{21}/I_5$) | 18 | 23 |
| Bulk Density | 31.5 | 32.2 |
| Ash (wt %) | .082 | .055 |
| DI | 11 | 14.5 |
| CHMS | 14 | 19 |
| Film Properties |  |  |
| Dart Impact, g | 222  207  451 | 344 |
| mil | (1.0)  (0.6)  (1.0) | (0.55) |
| Tear MD | 12 | 17 |
| TD | 74 | 33 |
| Puncture, in-lb/mil | 16 | 16 |
| FAR | Ex* | Ex* |

-continued

| V, ppm | 12 | 7.9 |

*"Ex" means Excellent.
**"P" means Poor.

Examples 42-45 are directed to the use of catalysts formed by a preactivation step. In this procedure, the coimpregnated catalyst is heated in a hexane solution containing triethyl aluminum, promoter (such as $CHCl_3$ or $CHF_3$), and octene to 70° C. for a sufficient time so as to raise the activity of the coimpregnated catalyst in polymerizing ethylene.

| Example | 42 | 43 | 44 | 45 |
|---|---|---|---|---|
| Catalyst | Q | Q | R | R |
| Promoter | $CFCl_3$ | $CFCl_3$ | $CFCl_3$ | $CFCl_3$ |
| Cocatalyst | TIBA | TIBA | TIBA | TIBA |
| Al/V + Zr | 70 | 70 | 70 | 70 |
| Promoter/V + Zr | 70 | 70 | 70 | 70 |
| V/Zr | .88 | .88 | 1.81 | 1.81 |
| Polymerization | | | | |
| Temperature (°C.) | 95 | 95 | 85 | 90 |
| Comonomer (mls) | 5 | 5 | 5 | 5 |
| Activity | 1057 | 1227 | 1626 | 2413 |
| Polyethylene | | | | |
| Density | 0.959 | 0.958 | 0.960 | 0.960 |
| $MI(I_2)$ | 5.16 | 1.5 | 0.09 | 0.19 |
| $FI(I_{21})$ | 2361 | 479 | 63.2 | 74.5 |
| MFR | 458 | 320 | 705 | 394 |
| DI | — | — | 70.2 | 40.1 |
| % CHMS | — | — | 17 | 15 |

The following examples 46-48 illustrate the resultant advantages of enhanced catalyst activity and MFR achieved by reason of catalyst features of reducing vanadium, e.g., $V^{+3}$ to $V^{+2}$, in the presence of THF and subsequently reacting the reduced vanadium with zirconium alkoxide and an activating composition.

Comparative catalyst S of examples 46 and 47 was prepared by suspending 10 grams of solid A ($VCl_3$ on silica) in 25 ml of THF and adding 0.81 ml of zirconium tetra-n-propoxide so as to achieve a V/Zr ratio of 1.5. The mixture was stirred for 30 minutes at room temperature (23° C.) followed by evaporation under vacuum at 65° C. to a powder. Elemental analysis of the intermediate precursor showed 0.294 mmol V/g, 0.153 mmol Zr/g and V/Zr of 1.92. The intermediate precursor was converted to Catalyst S by slurrying 2 grams in 10 ml hexane and ethylaluminum dichloride was added such that the Al/Zr ratio is 5 (1.65 ml EADC, 25% in heptane). The mixture was stirred for 1 hour and the residue was dried at 65° C. under vacuum to give a tan powder. Elemental analyses showed Catalyst S contained 0.264 mmol V/g, 0.133 mmol Zr/g and V/Zr of 1.98.

Comparative catalyst T of example 48 was prepared by suspending 4 grams of Solid B in 20 ml THF until the green color of $V^{+2}$ was observed. Then a solution containing 0.31 grams of $ZrCl_4$ in 10 ml THF was added with stirring for 30 minutes, followed by residue drying under vacuum at 65° C. Elemental analyses showed the catalyst contained 0.31 mmol V/g, 0.211 mmol Zr/g, and a V/Zr ratio of 1.48. Laboratory polymerization data for comparative catalysts S and T are shown in examples 46, 47 and 48 below.

| Example | 46 | 47 | 48 |
|---|---|---|---|
| Catalyst | S | S | T |

| Example | 46 | 47 | 48 |
|---|---|---|---|
| Promoter | $CFCl_3$ | $CFCl_3/$ $CH_2Cl_2$ | $CFCl_3/$ $CH_2Cl_2$ |
| Cocatalyst | TIBA | TEA | TEA |
| Al/V + Zr | 70 | 70 | 70 |
| Promoter/V + Zr | 70 | 70 | 70 |
| V/Zr | 1.98 | 1.98 | 1.48 |
| Polymerization | | | |
| Temperature (°C.) | 85 | 85 | 85 |
| Comonomer (mls) | 5 | — | — |
| Activity | 454 | 350 | 291 |
| Polyethylene | | | |
| Density | .965 | — | — |
| $MI(I_2)$ | 0.121 | 0.33 | 0.24 |
| $FI(I_{21})$ | 12.9 | 29.8 | 37 |
| MFR | 107 | 90.8 | 160 |

The following examples demonstrate the ability of the process of the invention to produce in a single reactor a quality ethylene polymer having a broad molecular weight distribution comparable or superior to commercial ethylene polymers having a broad molecular weight distribution.

| Example | 49 | 50 | 51 | 52 |
|---|---|---|---|---|
| Polymer Identity | Source: this invention | Source: this invention | Source: Union Carbide DGDA 6609(V) | Source: Occidental Chem. Corp. L5005 Stage Reactor Product |
| $FI(I_{21})$ | 3.7 | 5.4 | 7.5 | 7.5 |
| MFR | 23 | 25 | 22 | 28 |
| Density | 0.947 | 0.943 | 0.946 | — |
| DI | 14.5 | 40 | 16.8 | 27 |
| Gauge (mils) | 0.55 | 0.5 | 0.5-0.6 | 0.5-0.6 |
| Tear, MD | 17 | 15 | 15 | 22-25 |
| MD | 33 | 101 | 45 | 40-50 |
| Puncture (in-lb/mil) | 16 | 11 | 13.3 | 9.8 |
| FAR | Ex* | Ex* | Ex* | Ex* |

*"Ex" means Excellent.

We claim:

1. A latent catalyst composition comprising a reduced vanadium (<3) compound and a zirconium organooxy compound codeposited on an active carrier material and complexed with an electron donor material.

2. The latent catalyst composition of claim 1 wherein the zirconium organoxy compound is coimpregnated on the carrier material with the reduced vanadium compound.

3. The latent catalyst composition of claim 2 wherein the coimpregnation is coincidental.

4. The latent catalyst composition of claim 2 wherein the coimpregnation is sequential.

5. A preactivated latent catalyst composition which comprises the coimpregnated latent catalyst of claim 2 subjected to heat treatment in a solution of a hydrocarbon solvent, an aluminum alkyl, a promoter, and an alpha-olefin.

6. A catalyst composition comprising the latent catalyst composition of claim 2 treated with a Group 13 element activating composition or compound.

7. A process for the manufacture of a vanadium and zirconium containing catalyst which comprises a multisequential impregnation procedure involving:
   (i) sequentially impregnating an active carrier material with a liquid compound which is or contains a vanadium$^{(+3\ and\ higher)}$ compound followed by the reduction on the support of the vanadium compound by the deposition of a liquid reducing agent and effecting the formation of a reduced vanadium$^{(<3)}$ compound on the support surfaces or impregnating an active carrier with such reduced vanadium$^{(<3)}$ compound,
   (ii) depositing a liquid zirconium organooxy compound onto the support,
   (iii) providing an electron donor compound for the intercomplexation of the vanadium and zirconium compounds on the support surfaces,
   (iv) drying the sequentially impregnated support to form a flowing powder, and
   (v) impregnating the dried sequentially impregnated support with a Group 13 element-containing activating composition or compound.

8. A process for the manufacture of a vanadium and zirconium containing catalyst which comprises a two step impregnated procedure involving coincidental impregnation in one step followed by a sequential impregnation, involving:
   (i) independently reducing a liquid vanadium $^{(+3\ and\ higher)}$ to a vanadium $^{(<3)}$ compound,
   (ii) forming a liquid mixture of the vanadium $^{(<3)}$ compound with a zirconium organooxy compound, which mixture contains an electron donor compound for the intercomplexation of the vanadium and zirconium in the mixture,
   (iii) coincidentally impregnating the support with the liquid mixture of (ii),
   (iv) drying the support to form a flowing powder, and
   (v) impregnating the dried coincidentally impregnated support with a Group 13 element-containing activating composition or compound 9. The process of claim 7 wherein the catalyst is preactivated by heat treatment in a solution of a hydrocarbon solvent, an aluminum alkyl, a promoter, and an alpha-olefin.

10. The process of claim 8 wherein the catalyst is preactivated by heat treatment in a solution of a hydrocarbon solvent, an aluminum alkyl, a promoter, and an alpha-olefin.

11. A catalyst composition comprising
   a. a reduced vanadium $^{(<3)}$ compound and a zirconium organooxy compound codeposited on an active carrier material and complexed with an electron donor material, and treated with a Group 13 element activating composition or compound,
   b. an aluminum alkyl cocatalyst, and c. a halogenated organic promoter.

12. The catalyst composition of claim 11 wherein the zirconium organoxy compound is coimpregnated on the carrier material with the reduced vanadium compound.

13. The catalyst composition of claim 12 wherein the coimpregnation is effected by coincidental deposition.

14. The catalyst composition of claim 12 wherein the coimpregnation is effected by sequential deposition.

15. A preactivated catalyst composition which comprises the coimpregnated catalyst of claim 12 subjected to heat treatment in a solution of a hydrocarbon solvent, an aluminum alkyl, a promoter, and an alpha-olefin.

16. The catalyst composition of claim 11 wherein the aluminum alkyl cocatalyst is of the formula:

$$AlR_3 \qquad (V)$$

wherein R is an alkyl radical having 1 to 14 carbon atoms, and each R is alike or different.

17. The catalyst composition of claim 6 wherein the Group 13 element activating composition has the formula:

$$MeR^o{}_{(3-a)}X_a \qquad (III)$$

wherein Me is an element from Group 13, each $R^o$ is independently alkyl provided that the total number of aliphatic carbon atoms in any one $R^o$ group may not exceed 14; X is chlorine, bromine or iodine; and a is 1,2 or 3.

18. The catalyst composition of claim 17 wherein the Group 13 element is one or more of boron, aluminum, gallium, indium and tantalum.

19. The catalyst composition of claim 18 wherein the Group 13 element is one or more of boron and aluminum.

20. The catalyst composition of claim 19 wherein the Group 13 element is aluminum.

21. The catalyst composition of claim 19 wherein the Group 13 element is boron.

22. The latent catalyst composition of claim 1 wherein the zirconium organooxy compound has the formula:

$$Zr(OR')_4 \qquad (II)$$

in which R' are one or more of an alkoxy or acyloxy group.

23. The latent catalyst composition of claim 2 wherein the zirconium organooxy compound has the formula:

$$Zr(OR')_4 \qquad (II)$$

in which R' are one or more of an alkoxy or acyloxy group.

24. The latent catalyst composition of claim 3 wherein the zirconium organooxy compound has the formula:

$$Zr(OR')_4 \qquad (II)$$

in which R' are one or more of an alkoxy or acyloxy group.

25. The latent catalyst composition of claim 4 wherein the zirconium organooxy compound has the formula:

$$Zr(OR')_4 \qquad (II)$$

in which R' are one or more of an alkoxy or acyloxy group.

26. The latent catalyst composition of claim 5 wherein the zirconium organooxy compound has the formula:

$$Zr(OR')_4 \qquad (II)$$

in which R' are one or more of an alkoxy or acyloxy group.

27. The latent catalyst composition of claim 6 wherein the zirconium organooxy compound has the formula:

$$Zr(OR')_4 \qquad (II)$$

in which R' are one or more of an alkoxy or acyloxy group.

28. The latent catalyst composition of claim 1 wherein the vanadium compound is a vanadium halide and the electron donor is a liquid, organic Lewis base in which the vanadium halide and zirconium organooxy compound are soluble.

29. The latent catalyst composition of claim 2 wherein the vanadium compound is a vanadium halide and the electron donor is a liquid, organic Lewis base in which the vanadium halide and zirconium organooxy compound are soluble.

30. The latent catalyst composition of claim 3 wherein the vanadium compound is a vanadium halide and the electron donor is a liquid, organic Lewis base in which the vanadium halide and zirconium organooxy compound are soluble.

31. The preactivated latent catalyst composition of claim 5 wherein the vanadium compound is a vanadium halide and the electron donor is a liquid, organic Lewis base in which the vanadium halide and zirconium organooxy compound are soluble.

32. The catalyst composition of claim 6 wherein the vanadium compound is a vanadium halide and the electron donor is a liquid, organic Lewis base in which the vanadium halide and zirconium organooxy compound are soluble.

33. The latent catalyst composition of claim 28 wherein the vanadium halide is a vanadium chloride and the electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof.

34. The latent catalyst composition of claim 29 wherein the vanadium halide is a vanadium chloride and the electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof.

35. The latent catalyst composition of claim 30 wherein the vanadium halide is a vanadium chloride and the electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof.

36. The latent catalyst composition of claim 31 wherein the vanadium halide is a vanadium chloride and the electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof.

37. The latent catalyst composition of claim 32 wherein the vanadium halide is a vanadium chloride and the electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof.

38. The latent catalyst composition of claim 33 wherein the electron donor is tetrahydrofuran.

39. The latent catalyst composition of claim 34 wherein the electron donor is tetrahydrofuran.

40. The latent catalyst composition of claim 35 wherein the electron donor is tetrahydrofuran.

41. The latent catalyst composition of claim 36 wherein the electron donor is tetrahydrofuran.

42. The latent catalyst composition of claim 37 wherein the electron donor is tetrahydrofuran.

43. The latent catalyst composition of claim 1 wherein a magnesium halide of the formula:

$$MgX_2 \qquad (IV)$$

wherein X is halogen is co-deposited on the active carrier material.

44. The latent catalyst composition of claim 2 wherein a magnesium halide of the formula:

$$MgX_2 \qquad (IV)$$

wherein X is halogen is co-impregnated on the active carrier material.

45. The latent catalyst composition of claim 3 wherein a magnesium halide of the formula:

$$MgX_2 \qquad (IV)$$

wherein X is halogen is co-impregnated on the active carrier material.

46. The latent catalyst composition of claim 4 wherein a magnesium halide of the formula:

$$MgX_2 \qquad (IV)$$

wherein X is halogen is co-impregnated on the active carrier material.

47. The preactivated latent catalyst composition of claim 6 wherein a magnesium halide of the formula:

$$MgX_2 \qquad (IV)$$

wherein X is halogen is co-impregnated on the active carrier material.

48. The catalyst composition of claim 7 wherein a magnesium halide of the formula:

$$MgX_2 \qquad (IV)$$

wherein X is halogen is co-impregnated on the active carrier material.

49. The catalyst composition of claim 16 wherein a magnesium halide of the formula:

$$MgX_2 \qquad (IV)$$

wherein X is halogen is co-deposited on the active carrier material.

50. The catalyst composition of claim 11 wherein the cocatalyst is an aluminum alkyl of the formula:

$$AlR_3 \qquad (V)$$

wherein R is an alkyl radical having 1 to 14 carbon atoms, and each R is alike or different.

51. The catalyst composition of claim 12 wherein the cocatalyst is an aluminum alkyl of the formula:

$$AlR_3 \qquad (V)$$

wherein R is an alkyl radical having 1 to 14 carbon atoms, and each R is alike or different.

52. The catalyst composition of claim 13 wherein the cocatalyst is an aluminum alkyl of the formula:

$$AlR_3 \qquad (V)$$

wherein R is an alkyl radical having 1 to 14 carbon atoms, and each R is alike or different.

53. A catalyst composition comprising the preactivated catalyst of claim 15 and a cocatalyst which is an aluminum alkyl of the formula:

$$AlR_3 \qquad (V)$$

wherein R is an alkyl radical having 1 to 14 carbon atoms, and each R is alike or different.

* * * * *